(12) United States Patent
Logan

(10) Patent No.: US 6,386,614 B1
(45) Date of Patent: May 14, 2002

(54) WHEELCHAIR SYSTEM

(76) Inventor: Donald A. Logan, 251 Cree Crescent, Winnipeg, Manitoba (CA), R3J 3X4

( * ) Notice: Subject to any disclaimer, the term of this patent is extended or adjusted under 35 U.S.C. 154(b) by 0 days.

(21) Appl. No.: 09/673,610

(22) PCT Filed: Jul. 21, 2000

(86) PCT No.: PCT/CA00/00857

§ 371 Date: Jun. 11, 2001

§ 102(e) Date: Jun. 11, 2001

(87) PCT Pub. No.: WO01/08622

PCT Pub. Date: Feb. 8, 2001

(30) Foreign Application Priority Data

Jul. 30, 1999 (CA) .............................................. 2279170

(51) Int. Cl.[7] .................................................. B60N 2/02
(52) U.S. Cl. ............................... 296/65.03; 296/65.04; 297/DIG. 4
(58) Field of Search ........................... 296/65.03, 65.04; 297/DIG. 4

(56) References Cited

U.S. PATENT DOCUMENTS

| | | | | |
|---|---|---|---|---|
| 3,882,949 A | * | 5/1975 | Anderson | ......... 297/DIG. 4 X |
| 3,905,436 A | * | 9/1975 | Karchak, Jr. et al. | . 296/65.04 X |
| 4,076,268 A | * | 2/1978 | Hart | ..................... 296/65.04 X |
| 5,259,081 A | * | 11/1993 | Henderson | ................ 296/61 X |
| 5,466,111 A | * | 11/1995 | Meyer | ............... 297/DIG. 4 X |
| 5,911,465 A | * | 6/1999 | Yamamoto et al. | ...... 296/65.03 |
| 6,154,899 A | * | 12/2000 | Brooke et al. | ..... 297/DIG. 4 X |
| 6,186,572 B1 | * | 2/2001 | Oh | .......................... 296/65.05 |

FOREIGN PATENT DOCUMENTS

| | | | | |
|---|---|---|---|---|
| DE | 29515846 | * | 1/1996 | |
| EP | 0136763 | * | 4/1985 | ............ 297/DIG. 4 |
| FR | 1508977 | * | 12/1967 | |
| FR | 2698540 | * | 11/1992 | |
| GB | 1045158 | * | 10/1966 | |

* cited by examiner

Primary Examiner—Dennis H. Pedder
(74) Attorney, Agent, or Firm—Ryan W. Dupuis; Adrian D. Battison; Michael R. Williams

(57) ABSTRACT

A wheelchair system is provided for use with conventional passenger vehicles. The system includes a wheelchair frame for supporting a conventional seat of the vehicle thereon for rolling movement along the ground. The wheelchair frame includes a lift frame which permits the seat to be supported thereon at various heights and inclinations relative to the ground. A portable ramp permits the wheelchair frame to be rolled in and out of the vehicle. A docking system mounts in place of conventional existing floor anchors in the floor of the vehicle for securing the wheelchair frame thereon in a transport position. The use of the wheelchair frame and the docking system permits a vehicle such as a mini-van to be adapted to transport a disabled person requiring the use of a wheelchair, with no structural modification required to the vehicle while providing a comfortable and aesthetically pleasing seat for the disabled person.

19 Claims, 5 Drawing Sheets

WHEELCHAIR SYSTEM

FIELD OF THE INVENTION

This invention relates to a wheelchair system for use with conventional passenger vehicles and more particularly to a wheelchair frame for adjustably supporting a seat thereon.

BACKGROUND

When disabled persons requiring the use of a wheelchair desire transportation in a vehicle it is often awkward and difficult without the use of an expensive system adapted for large traditional sized vans or without significant modification to smaller vans due to the arrangement of conventional wheelchairs.

A known reference point when discussing mobility aids such as wheelchairs is the Point-P. The Point-P is defined as the centre of a circle being 100 millimetres in diameter lying in the plane of symmetry of the wheelchair, that is in side elevation tangent to both the backrest and upper surface of the wheelchair seat with any padding depressed as if it were occupied and the wheelchair backrest pulled taut.

Conventional wheelchairs have a Point-P which is approximately twenty two inches above the ground. This is much higher than the equivalent Point-P found on conventional seats of most passenger vehicles. The result is a raised seating position for a person in a wheelchair in a vehicle relative to the other occupants of the vehicle. The problem which results is a significant lack of headroom for the person in the wheelchair relative to the other occupants.

The known systems for transporting disabled persons in wheelchairs thus generally require a large vehicle for creating enough headroom that the person in the wheelchair can sit upright when rolled into the vehicle. In the case of smaller vans and mini-vans a modified roof or floor structure is generally required for creating the desired headroom. Such wheelchair systems are quite expensive.

In order for a disabled person to sit in a conventional vehicle without the use of an in vehicle wheelchair system, the person requires being assisted by someone capable of lifting the person from their wheelchair and awkwardly placing them in one of the existing seats of the vehicle. The wheelchair must then be collapsed and stored separately in the trunk or elsewhere in the vehicle. The process of transferring to the vehicle seat and the storing of the wheelchair requires significant strength on the part of the disabled person as well as the person assisting them. The task of transporting a person requiring the use of a wheelchair is thus made quite difficult without the use of a wheelchair system designed for the task.

SUMMARY

According to one aspect of the present invention there is provided a wheelchair system for use with a mini-van having a plurality of passenger seats each with a Point-P seating reference point and floor anchors in a floor of the mini-van for securing at least one of the passenger seats on the floor of the mini-van, the wheelchair system comprising:
  a wheelchair having:
    a frame arranged to mount a seat thereon such that a Point-P seating reference point of the seat is substantially in a common plane with the Point-P of the passenger seats when the frame is positioned on the floor of the mini-van in a transport position; and
    a set of wheels supporting the frame for rolling movement along the ground;
  a docking system for securing the wheelchair to the floor anchors in the transport position; and
  a portable ramp system for rolling the wheelchair in and out of the mini-van.

The wheelchair system of the present invention provides a wheelchair which allows a disabled person to sit upright while having enough headroom in a mini-van with no structural modification to the mini-van being required. The wheelchair has a Point-P which is positioned close to the ground by positioning the seat of the wheelchair such that it is inclined downward toward the rear of the seat, similarly to passenger seats in conventional passenger vehicles.

The frame may be adjustable such that the seat is movable from the transport position to an alternative seating position wherein the seat is spaced vertically from the transport position.

The seat preferably extends at a downward incline from a front end to a rear end of the seat in the transport position. The seating position of a person in the seat thus resembles the seating position of other occupants in the vehicle, while providing sufficient headroom to the person in the wheelchair.

The frame may be arranged to mount one of the passenger seats thereon while the docking system may comprise a docking plate arranged to mount on the existing floor anchors of the mini-van, the docking plate being arranged to engage the frame in the transport position for securing the frame thereon. The docking plate may further include adjustable mounting means for mounting on various floor anchor configurations. In this arrangement, the wheelchair system makes use of an existing seat of the vehicle for improved appearance and for minimal installation cost of the system by using as many existing parts of the vehicle as possible.

The docking plate may include a plurality of lugs mounted thereon while the frame may include a plurality of channels mounted thereon in respective alignment with the lugs on the docking plate in the transport position, the channels being arranged to secure the lugs therein.

According to a second aspect of the present invention there is provided a wheelchair system for use with a vehicle having a plurality of occupant seats supported by respective seat frames on respective existing floor anchors on a floor of the vehicle, the wheelchair system comprising:
  a wheelchair frame arranged to support one of the occupant seats of the vehicle thereon;
  a set of wheels supporting the wheelchair frame for rolling movement along the ground;
  a docking system for securing the wheelchair frame to the floor of the vehicle in a transport position; and
  a portable ramp system for rolling the wheelchair frame with an occupant seat supported thereon in and out of the vehicle.

In this arrangement, the wheelchair system makes use of an existing seat of the vehicle for improved appearance of the wheelchair and for minimal installation cost of the system by using as many existing parts of the vehicle as possible.

The docking system preferably comprises a docking plate arranged to mount on the existing floor anchors of the vehicle, the docking plate being arranged to engage the frame in the transport position for securing the frame thereon.

The wheelchair frame may include adjustable mounting means for mounting various seat configurations thereon.

It is preferred that a handle frame be mounted adjacent the rear end of the seat for supporting a pair of handles thereon.

The handles may be slidably mounted on the handle frame for adjusting a relative height of the handles in relation to the seat.

According to a further aspect of the present invention there is provided a wheelchair for supporting a person thereon, the wheelchair comprising:

- a seat having a front and rear end, the seat being arranged to support the person thereon;
- a docking plate frame supported for rolling movement along the ground;
- a lift frame pivotally mounted on the docking plate frame, the lift frame pivotally mounting the seat thereon;
- a forward actuator associated with the front end of the seat for controlling a height of the front end of the seat in relation to the docking plate frame; and
- a rearward actuator associated with the rear end of the seat for controlling a height of the rear end of the seat in relation to the docking plate frame, the forward and rearward actuators being operative independently of one another.

The arrangement of the lift frame permits the seat to be positioned at be various heights and inclinations as desired for the comfort of the person supported in the seat. These positions may include a lowered seating position for headroom in a vehicle and a raised position for ease of standing up from the seat or for sitting at an appropriate height at a table for instance.

The seat is preferably movable between an inclined seating position in which the seat extends at a downward incline from the front end to the rear end thereof, a raised seating position in which the seat is raised in relation to the inclined seating position and a standing assistance position in which the seat extends at a downward incline from the rear end to the front end thereof.

When using the wheelchair for vehicular transport, the lift frame is preferably pivotally mounted on a front end of the docking plate frame with the seat being pivotally mounted on the lift frame at the rear end of the seat. A docking lock can thus be mounted on a rear end of the lift frame for securement to a floor of the vehicle in a transport position wherein the docking lock insures that the seat is adequately secured to the floor regardless of the condition of the actuators.

One of the actuators is preferably coupled between the docking plate frame and the lift frame with the other actuator being coupled between the lift frame and the seat.

The actuators may comprise air spring cylinders. When using air spring cylinders, a pair of cable operated mechanisms may be mounted adjacent the rear end of the seat wherein the mechanisms are operatively associated with the actuators respectively for selectively locking the respective actuators independently of one another at various positions of the actuators.

The seat may comprise a seat frame arranged to mount a conventional vehicle seat thereon wherein there may be provided a docking system arranged to mount the docking plate to existing floor anchors in a floor of a conventional passenger vehicle.

It is preferred that there be provided a rear seat cushion pivotally mounted on the seat for movement between an upright position and a reclined position wherein the rear seat cushion extends substantially horizontally rearward from the seat.

BRIEF DESCRIPTION OF THE DRAWINGS

In the accompanying drawings, which illustrate an exemplary embodiment of the present invention.

DETAILED DESCRIPTION

Figure 6:
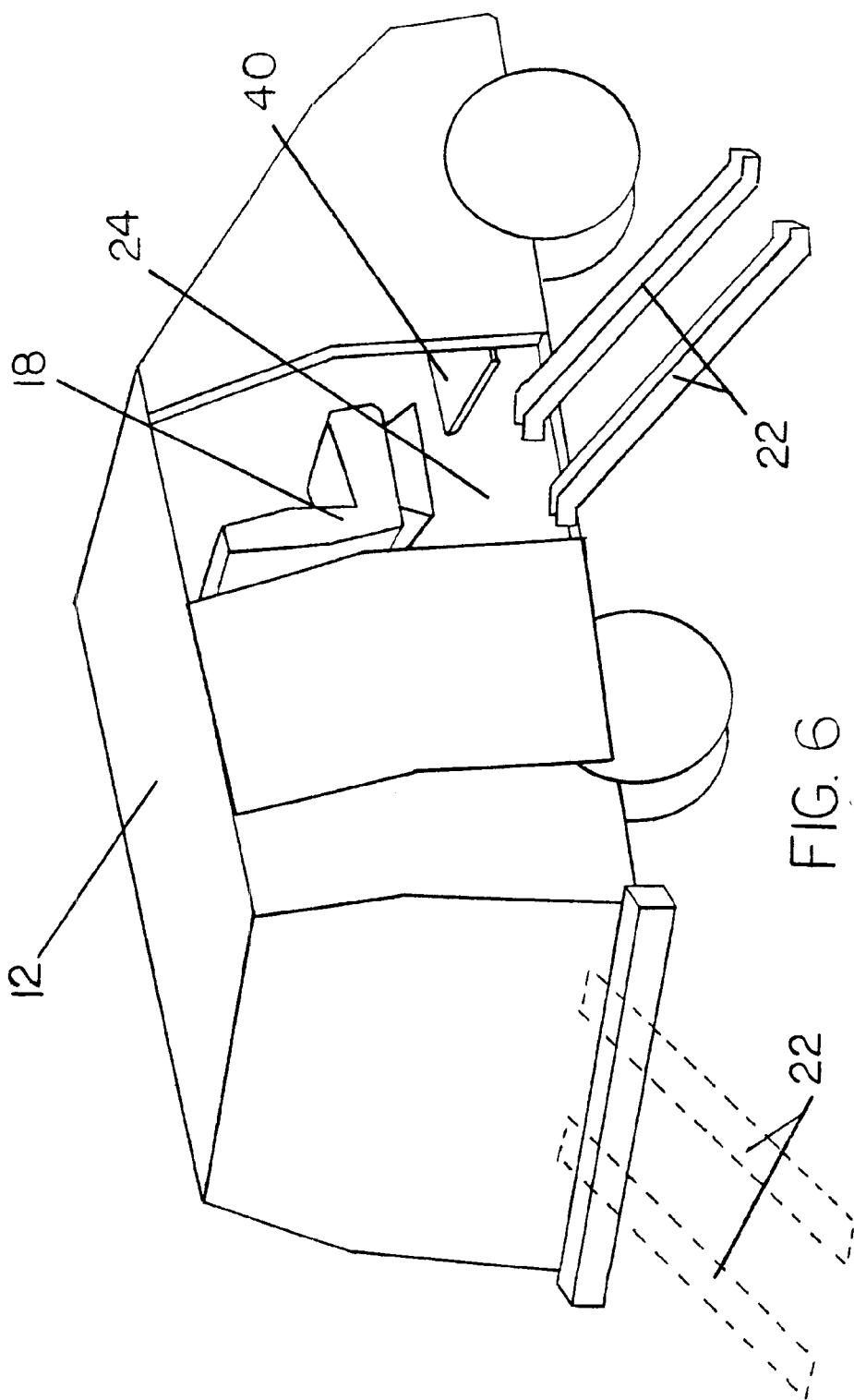
FIG. 6 is an isometric view of the wheelchair system as it is used on a conventional mini-van.

Referring to the accompanying drawings, there is illustrated a wheelchair system 10 arranged for use in a conventional passenger vehicle 12, for example a mini-van as shown in FIG. 6. The wheelchair system 10 generally comprises a wheelchair 14 having a frame 16 which is arranged to mount an occupant seat 18 of the vehicle thereon and support the seat,for rolling movement across the ground. A pair of portable ramps 22 are additionally provided for rolling the wheelchair 14 from the ground onto the floor of the vehicle. The ramps 22 are commercially available type ramps for use with wheelchairs.

At The seat 18 of the wheelchair 14 is a standard vehicle seat similar to that which is normally anchored to the floor 24 of the vehicle by a standard seat frame secured to existing floor anchors in the floor 24.

The seat 18 includes a bottom cushion 26 which extends from a front end 28 to a rear end 30 of the seat. A back cushion 32 is pivotally mounted on the rear end of the bottom cushion for movement between an upright position shown in solid line in FIG. 2 and a reclined position shown in dashed line in FIG. 2 in which the back cushion extends substantially horizontally rearward from the bottom cushion.

The frame 16 includes a base frame 34 which is supported for rolling movement along the ground. A lift frame 36 is pivotally mounted on the front end of the of the base frame to extend generally rearward therefrom. A seat frame 38 is pivotally mounted at a rear end of the seat adjacent a rear end of the lift frame.

Figure 1:
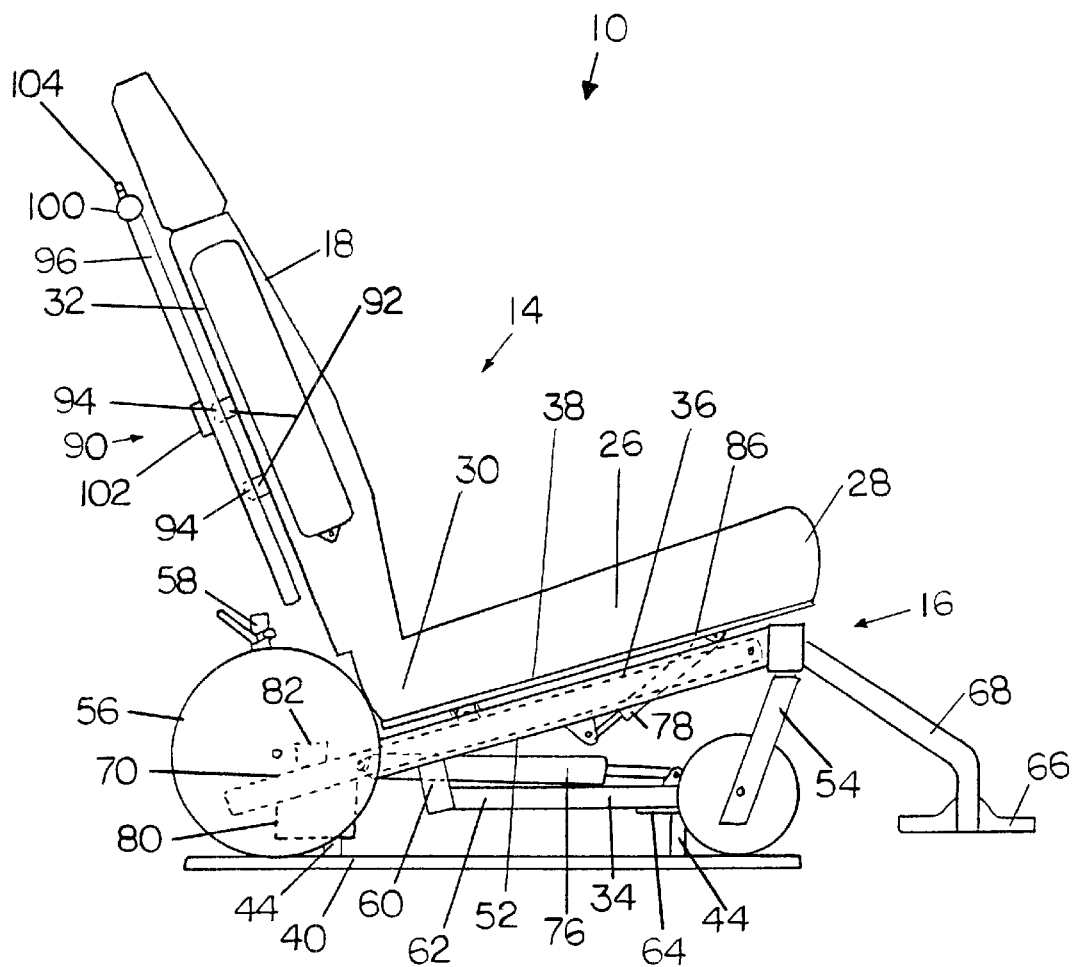
FIG. 1 is a side elevational view of the wheelchair according to the present invention in an inclined seating position.
Figure 2:
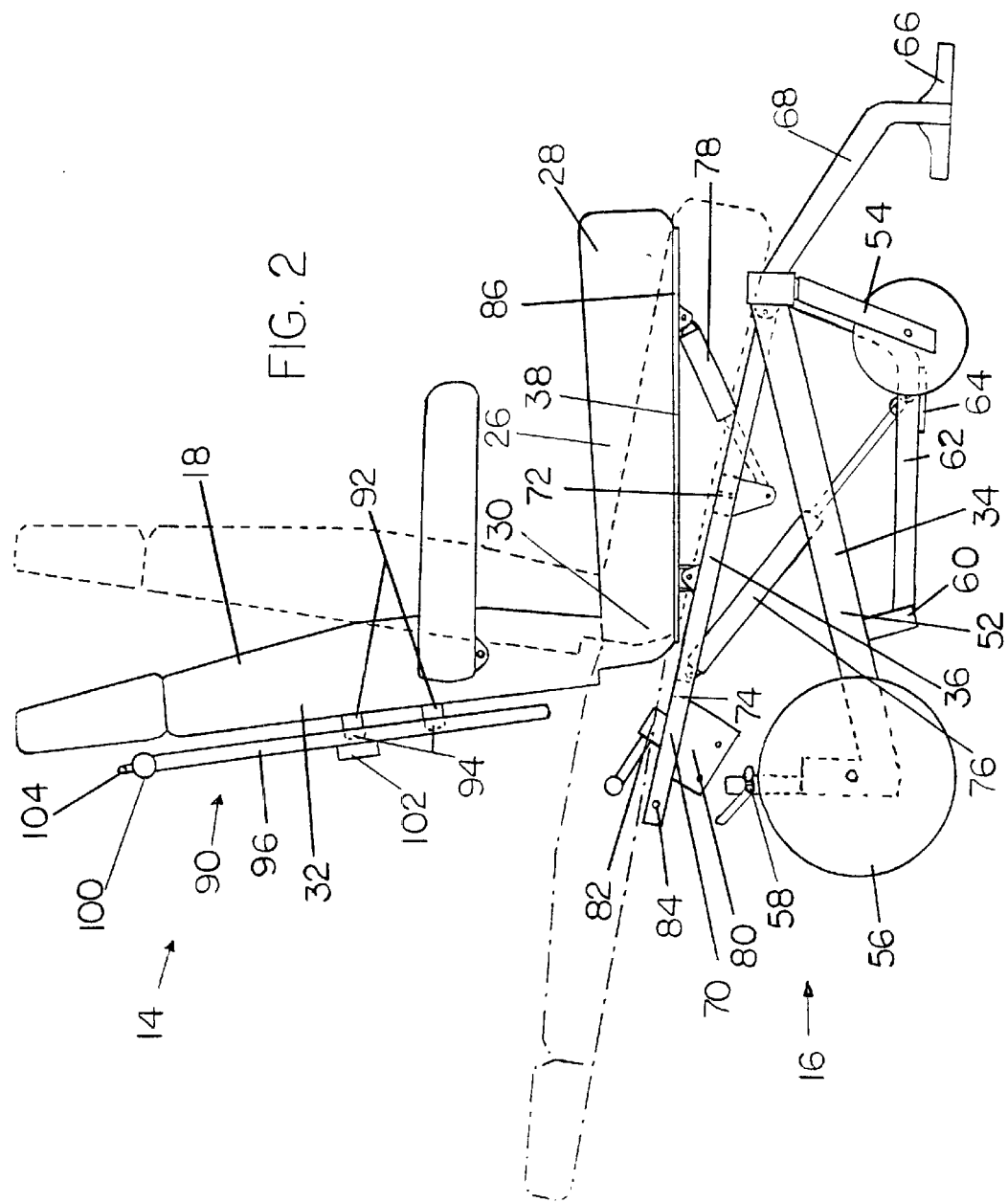
FIG. 2 is a side elevational view of the wheelchair of FIG. 1 showing the chair in respective raised, reclined and standing assistance positions.
Figure 3:
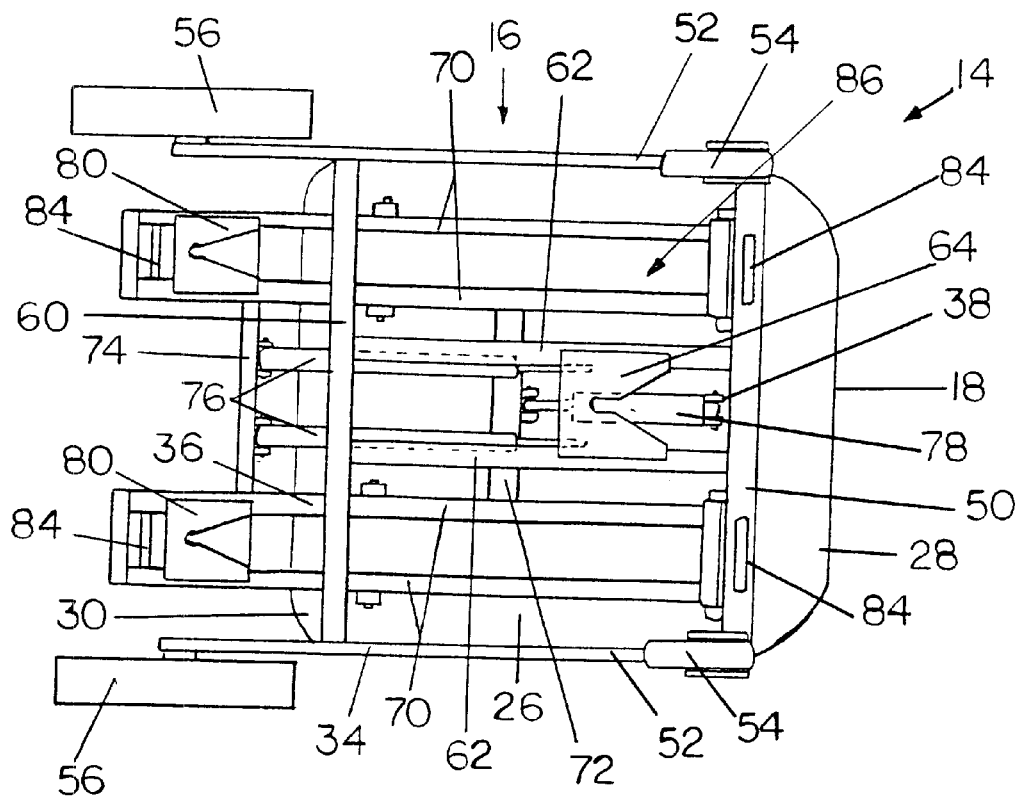
FIG. 3 is a bottom plan view of the wheelchair of FIG. 1.
Figure 4:
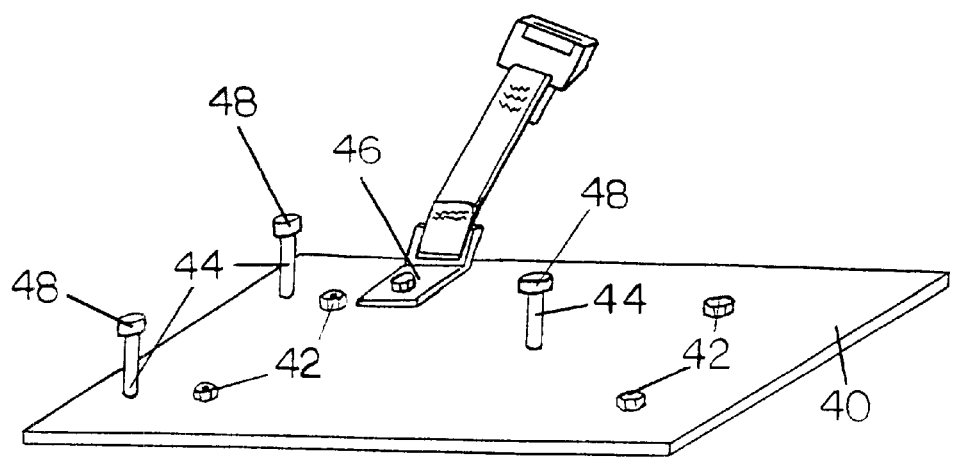
FIG. 4 is an isometric view of the docking plate for use with the wheelchair of FIG. 1.
Figure 5:
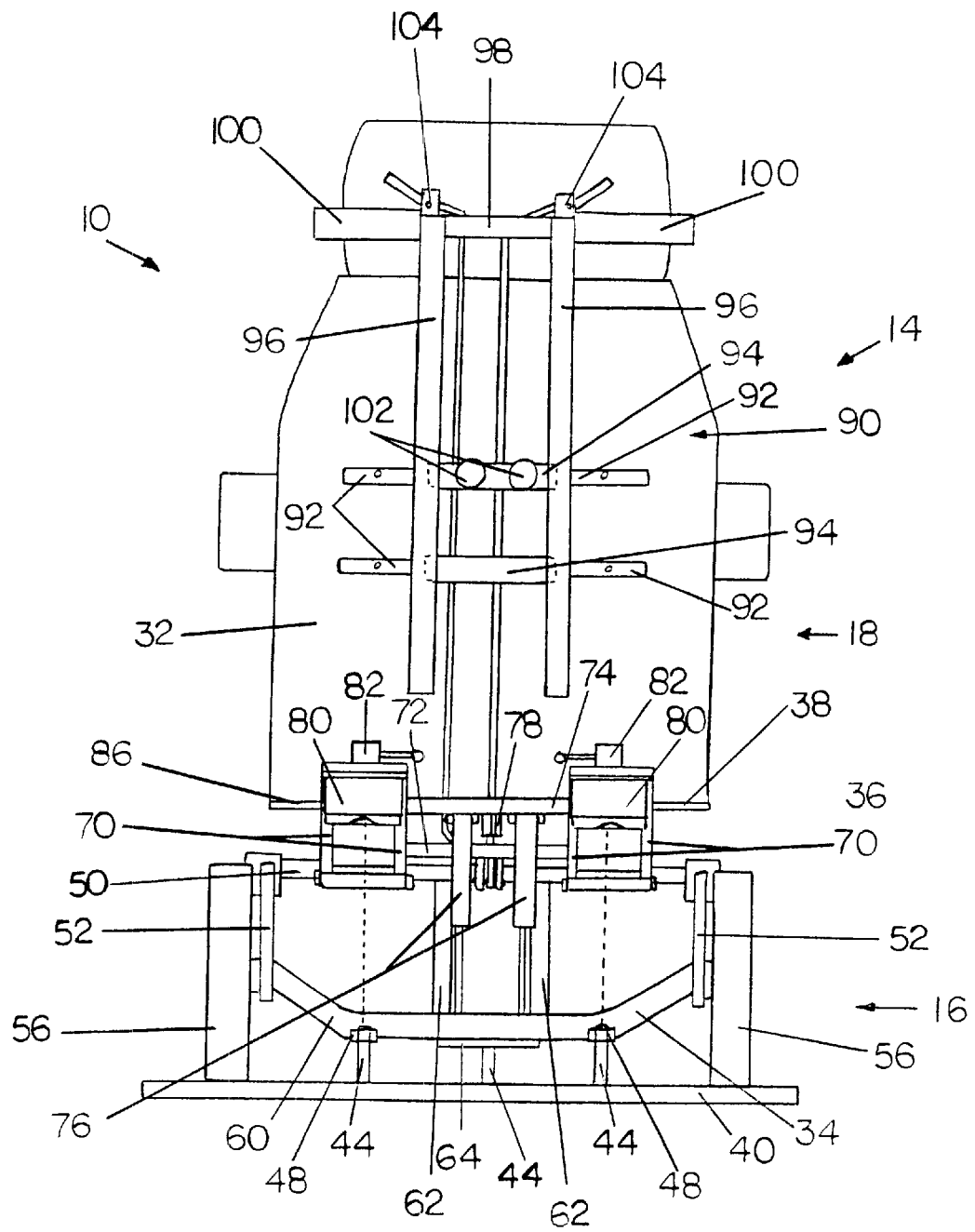
FIG. 5 is a rear elevational view of the wheelchair of FIG. 1.

In this arrangement the seat is movable between an inclined seating position as shown in FIG. 1 in which the bottom cushion extends at a downward incline from the front end to the rear end thereof; a raised seating position as shown in solid line in FIG. 2 in which the seat is raised in relation to the inclined seating position; and a standing assistance position as shown in dashed line in FIG. 2 in which the bottom cushion extends at a downward incline from the rear end to the front end thereof.

A docking system in the form of a docking plate 40 is arranged to mount on the existing floor anchors in the floor of the vehicle using bolts 42 which extend through mounting apertures in the plate. The location of the holes for receiving the bolts 42 can be selected according to the type of vehicle in which the plate 40 is to be installed such that the plate 40 can be adjustably mounted on different configurations of existing floor anchors.

The docking plate 40 includes a plurality of mounting posts 44 extending upwardly therefrom. A forwardmost post 44 is centrally located on the plate while a pair of rearward posts 44 are spaced apart across the rear end of the plate. The plate 40 further includes a seatbelt mount 46 for mounting the female end of a seatbelt coupling thereon. Each mounting post 44 includes a lug 48 on a top end thereof having a diameter which is greater than a diameter of the post, The base frame 34 includes a front cross bar 50 which extends laterally across a front end of the base frame. A pair of side rails 52 extend rearwardly and downwardly from respective front corners of the front cross bar.

A pair of castor wheels 54 are pivotally mounted on the front corners of the front cross bar 50 so as to support the respective side rails 52 thereabove. A rear wheel 56 is mounted on the rear end of each side rail 52 so as to be oriented for rolling movement in a forward direction with the castors. The rear wheels are equipped with conventional wheel stops 58 which assist in keeping the wheels from rotating when engaged thereon.

A rear cross bar 60 is coupled between the side rails 52 adjacent a rear end thereof for structural support. A central portion of the rear cross bar 60 is curved downwardly to accommodate the lift frame 36 between the side rails 52 in a lowered position of the frame. A pair of longitudinal supports 62 are spaced apart across a central portion of the front cross bar 50 to extend downwardly and then rearwardly therefrom for connection to the rear cross bar 60 at a rearward end thereof.

The longitudinal supports 62 mount a docking channel 64 therebetween adjacent the front end of the base frame for alignment with a forwardmost mounting post 44 of the plate 40 of the docking system. The docking channel 64 includes a slot therein for receiving the lug 48 at the top of the post 44 therein. The slot includes a wide mouth for ease of alignment of the post with the slot in the docking channel wherein the slot tapers rearwardly to an apex arranged to secure the mounting post therein.

A pair of foot supports 66 are pivotally mounted on respective support arms 68 similarly to conventional wheelchair foot supports.

The lift frame 36 includes two pairs of parallel arms 70 which extend longitudinally with the frame. Each pair of arms is coupled at respective front and rear ends for structural support. The arms 70 are pivotally mounted at the front end thereof at spaced apart locations on the front cross bar 50 of the base frame to extend generally rearward therefrom.

A center cross bar 72 and a rear cross bar 74 are coupled between the pairs of arms adjacent a respective central and rearward location. A pair of spaced apart pivot mounts are located on the rear cross bar 74 in alignment with the longitudinal supports 62 for mounting a pair of rear actuators 76 on the respective pivot mounts. The rear actuators 76 are a piston-cylinder arrangement mounted at a cylinder end on the rear cross bar to extend generally downwardly and forwardly to a piston end mounted on the respective longitudinal supports 62. The lift frame further includes a pivot mount located centrally on the center cross bar 72 for mounting a piston end of a front actuator 78 thereon.

Each pair of arms 70 mounts a docking channel 80 therebetween at a rearward end thereof. The docking channels 80 are arranged for alignment with the rearwardmost posts 44 of the docking system and include a tapered slot similar to the docking channels 64 for receiving respective lugs 48 of the mounting posts 44 at their end. A locking clamp 82 is pivotally mounted on each docking channel 80 and includes a respective actuator lever for pivoting the clamp 82 into a locked position wherein the respective lug 48 is secured therein.

Strap mounts 84 provide an alternate mounting arrangement of the docking system for anchoring the frame 16 to the floor of the vehicle using straps. These strap mounts are located at spaced apart locations on the front cross bar 50 and at rear end of each pair of arms 70.

The seat frame 38 includes a mounting plate 86 arranged to mount one of the seats 18 thereon. The plate includes a plurality of mounting apertures therein for accommodating various seat configurations to be mounted thereon. A pivot mount is located centrally on the plate 86 adjacent a front end thereof for mounting the cylinder end of the front actuator 78 thereon. A further pair of pivot mounts are spaced apart adjacent a rear end of the mounting plate 86 for pivotally mounting the rear end of the seat on the lift frame adjacent a rear end thereof but spaced forwardly of the docking channels 80.

A handle frame 90 is mounted on a rear face of the back cushion 32 of seat. The handle frame 90 includes a pair of cross supports 92 having adjustable mounting locations thereon for mounting at vertically spaced positions to extend laterally across the back cushion. A guide block 94 is mounted on each cross support 92 to support a pair of upright channels 96 thereon. The channels 96 are coupled by a cross bar 98 at a top end thereof and are arranged to face inwardly for longitudinal sliding movement along the respective ends of the guide blocks 94 which are received within the channels.

A pair of handles 100 extend laterally outward from the top end of the respective channels 96. The sliding movement of the channels along the guide blocks permits a height of the handles in relation to the seat to be adjusted. A pair of cam locks 102 are pivotally mounted in the uppermost guide block 94 for selectively engaging the respective channels 96 such that the channels are fixed in position when the cam locks 102 are engaged.

The front and rear actuators 78 and 76 each comprise an air spring in a piston-cylinder arrangement to assist in lifting the seat when adjusting a relative height of the seat. The forward actuator Is associated with the front end of the seat for controlling the relative height of the front end while the rearward actuators are associated with the rear end of the seat for controlling the relative height of the rear end as the respective actuators are extended and contracted. A pair of cable operated locking mechanisms 104 are associated with the respective front and rear actuators for locking the respective pistons within their cylinders until release by respective levers located adjacent the handles 100.

The wheelchair frame 16 and the docking system can be used with any suitable seat or be permitted to use an existing occupants seat of a vehicle in which the system to be installed. When installing a wheelchair system 10 a selected occupant seat is removed from its standard seat frame in the vehicle and mounted on the seat frame 38 of the wheelchair. The standard seat frame of the vehicle is then removed and replaced with the plate 40 of the docking system which can be adjustably mounted on the existing floor anchors in the floor of the vehicle.

When used on a mini-van the portable ramps 22 may be aligned with either the side doors of the van as shown in solid line in FIG. 6 or the rear doors of the van as shown in dashed line in FIG. 6 to permit the wheelchair 14 to be rolled up the ramp and into the van. Once inside the van the wheelchair is aligned with the plate 40 of the docking system by using the tapered slots on the respective docking channels which are aligned to engage the respective mounting posts 44 on the plate 40. The locking clamps 82 on the rearward pair of docking channels may thus be pivoted and locked into a transport position of the wheelchair. The ramps 22 may subsequently be stored in the vehicle. The existing seatbelt of the vehicle may be used and coupled to the seatbelt mount 46 of the docking system. In order to exit the vehicle the reverse steps are used.

Using the wheelchair frame 16 of the present invention the height of the seat may be adjusted such that a point P reference point of the seat lies substantially in a common plane with the point P of the other occupant seats in the vehicle regardless of the seat type used. The design of the wheelchair frame 16 is further useful in accommodating the various desired seating positions of a person supported in the wheelchair.

In further arrangements the docking plate or the mounting plate 86 of the seat frame may be replaced with other suitable adjustable mounting means. The seat frame in particular may comprise a set of crossbars which are mounted across the bottom of an existing vehicle occupant seat at an adjustable location. The mounts on the seat frame would thus be located on the crossbars instead of being located on the mounting plate 86.

While one embodiment of the present invention has been described in the foregoing, it is to be understood that other embodiments are possible within the scope of the invention. The invention is to be considered limited solely by the scope of the appended claims.

What is claimed is:

1. A wheelchair system for use with a vehicle having a plurality of occupant seats supported by respective seat frames on respective existing floor anchors on a floor of the vehicle, the wheelchair system comprising:
   a wheelchair frame arranged to support an occupant seat thereon;
   a set of wheels supporting the wheelchair frame for rolling movement along the ground;
   a docking system for securing the wheelchair frame to the floor of the vehicle in a transport position; and
   a portable ramp system for rolling the wheelchair frame in and out of the vehicle;
   wherein the docking system comprises a docking member arranged to mount on the existing floor anchors of the vehicle, the docking member being arranged to engage the frame in the transport position for securing the frame thereon.

2. The wheelchair system according to claim 1 wherein the frame is arranged to mount one of the occupant seats of the vehicle thereon.

3. The wheelchair system according to claim 2 wherein the docking member comprises a docking plate having apertures therein for receiving floor anchor fasteners therethrough.

4. The wheelchair system according to claim 2 wherein the docking member includes a plurality of lugs mounted thereon and the frame includes a plurality of channels mounted thereon in respective alignment with the lugs on the docking member in the transport position, the channels including locking clamps arranged to secure the lugs in the channels.

5. The wheelchair system according to claim 1 wherein there is provided a handle frame supported adjacent a rear end of the wheelchair frame for supporting a pair of handles thereon, the handles being slidably mounted on the handle frame for adjusting a relative height of the handles in relation to the wheelchair frame.

6. A wheelchair for supporting a person thereon, the wheelchair comprising:
   a seat having a front and rear end, the seat being arranged to support the person thereon;
   a base frame supported for rolling movement along the ground;
   a lift frame pivotally mounted on the base frame, the lift frame pivotally mounting the seat thereon;
   a forward actuator associated with the front end of the seat for controlling a height of the front end of the seat in relation to the base frame; and
   a rearward actuator associated with the rear end of the seat for controlling a height of the rear end of the seat in relation to the base frame;
   the forward and rearward actuators being operative independently of one another wherein one of the actuators is coupled between the base frame and the lift frame and the other actuator is coupled between the lift frame and the seat.

7. The wheelchair according to claim 6 wherein the seat is movable between an inclined seating position in which the seat extends at a downward incline from the front end to the rear end thereof, a raised seating position in which the seat is raised in relation to the inclined seating position and a standing assistance position in which the seat extends at a downward incline from the rear end to the front end thereof.

8. The wheelchair according to claim 6 wherein the lift frame is pivotally mounted on a front end of the base frame and the seat is pivotally mounted on the lift frame at the rear end of the seat.

9. The wheelchair according to claim 6 wherein the actuators comprise air spring cylinders.

10. The wheelchair according to claim 6 wherein there is provided a pair of cable operated mechanism mounted adjacent the rear end of the seat, the mechanisms being operatively associated with the actuators respectively for selectively locking the respective actuators independently of one another at various positions thereof.

11. A wheelchair system for use with a vehicle having a plurality of occupant seats supported on a floor of the vehicle, the wheelchair system comprising:
   a wheelchair having:
      a base frame supported for rolling movement along the ground;
      a lift frame mounted on the base frame for movement relative to the base frame between a raised seating position and a lowered seating position in which the lift frame is lowered in relation to the raised seating position; and
      a seat arranged to be supported on the lift frame for movement with the lift frame between the raised and lowered seating positions; and
   a docking system having a first docking member arranged to be secured to the floor of the vehicle and a second docking member attached to the wheelchair;
   characterized in that the second docking member is mounted on the lift frame of the wheelchair adjacent a rear end of the lift frame and is arranged to secure the rear end of the lift frame directly to the first docking member in a transport position of the wheelchair.

12. The system according to claim 11 wherein the lift frame is pivotally mounted on the base frame adjacent a front end of the base frame for pivotal movement between the raised and lowered seating positions.

13. The system according to claim 11 wherein there is provided a third docking member mounted on the base frame being arranged to secure the base frame to the first docking member in the transport position.

14. The system according to claim 11 wherein the second docking member comprising a pair of rear mounts mounted laterally spaced apart on the rear end of the lift frame.

15. The system according to claim 11 wherein the second docking member includes alignment means for aligning the second docking member with the first docking member into the transport position.

16. The system according to claim 11 wherein there is provided a seat frame arranged to pivotally mount the seat on the lift frame adjacent a rear end of the lift frame.

17. The system according to claim 11 wherein there is provided a seat frame arranged to pivotally mount the seat on the lift frame, the seat frame being arranged such that a height of a front end of the seat is adjustable independently of a condition of the docking system.

18. The system according to claim 11 wherein there is provided a seat frame arranged to pivotally mount the seat on the lift frame and a forward actuator coupled between the seat frame and the lift frame, the forward actuator being arranged to control a height of a front end of the seat in relation to the base frame.

19. The system according to claim 11 wherein there is provided a seat frame arranged to pivotally mount the seat on the lift frame and a rearward actuator coupled between the lift frame and the base frame, the rearward actuator being arranged to control a height of a rear end of the seat in relation to the base frame.

* * * * *